Patented Feb. 19, 1924.

1,484,249

UNITED STATES PATENT OFFICE.

WALTER BADER, OF SPONDON, NEAR DERBY, ENGLAND, ASSIGNOR TO DR. HENRY DREYFUS, OF LONDON, ENGLAND.

MANUFACTURE OF ALKYL COMPOUNDS.

No Drawing. Application filed October 13, 1921. Serial No. 507,577.

*To all whom it may concern:*

Be it known that I, WALTER BADER, a citizen of the Swiss Republic, of Spondon, near Derby, England, have invented certain new and useful Improvements in or Relating to the Manufacture of Alkyl Compounds, of which the following is a specification.

Of the neutral sulphates of primary alkyls only dimethyl sulphate has attained technical importance as an alkylating agent, because it is the only one that can be prepared on a a large scale with an economical yield. The higher alkyls treated by the methods hitherto known for the preparation of neutral sulphates yield large amounts of undesirable by-products, especially hydrocarbons of the ethylene type.

This invention relates to a process of manufacturing neutral alkyl sulphates which gives economical yields not only in small experiments but also on a large scale. It is particularly suitable for diethyl sulphate, which has not yet been prepared industrially in a satisfactory manner.

It has been proposed to prepare alkyl hydrogen sulphates, especially ethyl hydrogen sulphate, in a practically pure state by distilling sulphur trioxide into absolute primary alcohols, e. g. ethyl alcohol, at very low temperature, and then to convert them by distillation under reduced pressure into neutral alkyl sulphates. For diethyl sulphate a yield of 50% of the theory is said to be the highest obtainable by this method.

The distillation of a large quantity of ethyl hydrogen sulphate, even in a quick-working still, necessarily takes a considerable time. During this time those molecules of ethyl hydrogen sulphate that have not yet been decomposed are under the influence of high temperature, the consequence being that not only the reaction—

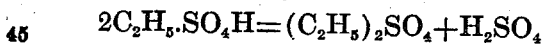

occurs, but a number of side-reactions, which result in the formation of ethylene, ethyl ether, ethionic acid, isoethionic acid, methionic acid, etc., and in a partial reduction of the sulphuric acid to sulphur dioxide. The accumulation of sulphuric acid in the process of distilling favours these parasitical side-reactions.

According to the present invention the distillation of alkyl hydrogen sulphates or of mixtures containing alkyl hydrogen sulphates is effected under reduced pressure in such a way that at any given moment only the small part of the liquid which is actually undergoing distillation is under the influence of the heat.

Further according to the invention the products of the distillation, i. e. vapours and residue are quickly and continuously removed from the point where distillation occurs, and from contact with the distilling liquid.

The invention comprises further features hereinafter appearing.

In carrying out the invention, the liquid to be distilled is introduced gradually, either in small portions or continuously, into the heated zone of a vacuum still which allows an instantaneous withdrawal of the vapours towards a condenser, and the continuous removal of the residue, so that it does not come in contact with the inflowing fresh liquid.

The invention is not concerned with any particular type of still. The liquid to be distilled may for instance be led to run as a thin film over a heated surface, or it may be deposited on a revolving drum or a traveling band which brings it in the hot zone of the still, or it may flow in a thin stream through a heated coil or down the interior of a heated revolving tube, or it may enter the still in the form of a spray, and so forth.

The liquid containing alkyl hydrogen sulphate may be prepared by several well known methods which do not form part of this invention.

It is indeed indifferent whether the liquid has been obtained by mixing a primary alcohol with sulphur trioxide or with fuming or ordinary sulphuric acid, or by absorbing an ethylenic hydrocarbon or an alkyl oxide in sulphuric acid, or by decomposing a salt of an alkyl sulphuric acid (e. g. ethyl sodium sulphate obtained as a by-product in using diethyl sulphate as an ethylating agent) by a strong mineral acid. In all these cases a solution results which is either substantially alkyl hydrogen sulphate or contains besides more or less sulphuric acid, free alcohol, water, ether etc. All these liquids yield dialkyl sulphate when treated by my method, but I prefer to use a mixture of alkyl hydrogen sulphate and the corresponding alcohol only, containing very little free sulphuric acid, water and other bodies. Such a mixture may for instance be prepared from sulphur trioxide and a large excess of a primary alcohol.

The following example is given as an explanation, but the invention is not confined to this particular way of execution.

Example.

The still is a vertical tube heated electrically or otherwise. The liquid to be distilled flows in at the top through a small revolving orifice which deposits it regularly all round on the inner surface of the tube, so that it flows downward as a thin film. A high vacuum is maintained in the tube which has one or more connections with a cooling and condensing system, e. g. an ice-cooled coil. The temperature to be kept depends on the vacuum obtainable, and may vary for ethyl hydrogen sulphate between 100 and 150° C.

A mixture,—prepared from 40 parts fuming sulphuric acid of 70% sulphur trioxide content and 60 parts of ethyl alcohol,—containing about 65% ethyl hydrogen sulphate and 30% free ethyl alcohol is drawn by the vacuum into the still, which is kept at 110° C. under an absolute pressure of 5 mm. mercury. At the bottom of the still there collects sulphuric acid and some tarry matter, while the distillate consists principally of diethyl sulphate, some ethyl hydrogen sulphate, free alcohol and a little water. The yield of diethyl sulphate is higher than the ethyl hydrogen sulphate present in the original liquid can explain, e. g. 110% or more of the theoretical yield calculated on the ethyl hydrogen sulphate originally present. The following equations are suggested as an explanation of this fact,—

(1) $2C_2H_5SO_4H = H_2SO_4 + (C_2H_5)_2SO_4$
(2) $H_2SO_4 + C_2H_5OH =$
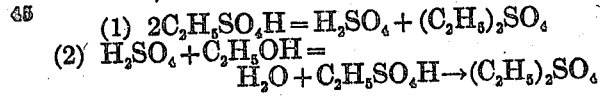
$H_2O + C_2H_5SO_4H \rightarrow (C_2H_5)_2SO_4$ according to which it would appear that the sulphuric acid liberated in the reaction combines immediately with the free alcohol present in the solution.

If the original liquor contains a considerable amount of free sulphuric acid, which is the case if it has been prepared with ordinary sulphuric acid, or with fuming acid of low anhydride content, a larger excess of free alcohol than indicated in the example is used with advantage.

In the distillate the diethyl sulphate appears as a separate layer. The other layer, consisting substantially of ethyl hydrogen sulphate and alcohol can simply be mixed with the liquor for a next operation. In this way all the alcohol used in excess returns into the process. The distillates may however be worked up in any other convenient way for the recovery of alcohol.

Other alkyl sulphates are prepared in a similar way by substituting methyl, propyl, butyl, etc. alcohol for ethyl alcohol in the example above.

What I claim and desire to secure by Letters Patent is:—

1. In a process for the manufacture of neutral alkyl sulfate, subjecting liquid containing free alkyl hydrogen sulfate to distillation under reduced pressure in a manner whereby at any given moment only that small part of the liquid which is actually undergoing distillation is under the influence of heat, and removing the products of distillation quickly and continuously from the distillation point and from contact with the distilling liquid.

2. In a process for the manufacture of neutral alkyl sulfate, subjecting liquid containing free alkyl hydrogen sulfate and the corresponding alkyl alcohol to distillation under reduced pressure in a manner whereby at any given moment only that small part of the liquid which is actually undergoing distillation is under the influence of heat, and removing the products of distillation quickly and continuously from the distillation point and from contact with the distilling liquid.

3. In a process for the manufacture of neutral alkyl sulfate, subjecting liquid containing free alkyl hydrogen sulfate and a considerable amount of the corresponding alkyl alcohol in an uncombined state, to distillation under reduced pressure, in a manner whereby at any given moment only that small part of the liquid which is actually undergoing distillation is under the influence of heat, and removing the products of distillation quickly and continuously from the distillation point and from contact with the distilling liquid.

4. In a process for the manufacture of neutral alkyl sulfate, subjecting a liquid consisting essentially of free alkyl hydrogen sulfate and the corresponding alkyl alcohol only, to distillation under reduced pressure, in a manner whereby at any given moment only that small part of the liquid which is actually undergoing distillation is under the influence of heat, and removing the products of distillation quickly and continuously from the distillation point and from contact with the distilling liquid.

5. In a process for the manufacture of diethyl sulfate, subjecting liquid containing free ethyl hydrogen sulfate to distillation under reduced pressure in a manner whereby at any given moment only that small part of the liquid which is actuatually undergoing distillation is under the influence of heat, and removing the products of distillation quickly and continuously from the distillation point and from contact with the distilling liqud.

6. In a process for the manufacture of diethyl sulfate, subjecting liquid containing free ethyl hydrogen sulfate and ethyl alcohol to distillation under reduced pressure in a manner whereby at any given moment only that small part of the liquid which is actually undergoing distillation is under the influence of heat, and removing the products of distillation quickly and continuously from the distillation point and from contact with the distilling liquid.

7. In a process for the manufacture of diethyl sulfate, subjecting liquid containing free ethyl hydrogen sulfate and a considerable amount of ethyl alcohol in an uncombined state, to distillation under reduced pressure in a manner whereby at any given moment only that small part of the liquid which is actually undergoing distillation is under the influence of heat, and removing the products of distillation quickly and continuously from the distilling point and from contact with the distilling liquid.

8. In a process for the manufacture of diethyl sulfate, subjecting a liquid consisting essentially of free ethyl hydrogen sulfate and ethyl alcohol only, to distillation under reduced pressure in a manner whereby at any given moment only that small part of the liquid which is actually undergoing distillation is under the influence of heat, and removing the products of distillation quickly and continuously from the distillation point and from contact with the distilling liquid.

9. In a process for the manufacture of diethyl sulfate, subjecting a liquid containing about 65 per cent of free ethyl hydrogen sulfate and about 30 per cent of free ethyl alcohol to distillation under reduced pressure in a manner whereby at any given moment only that small part of the liquid which is actually undergoing distillation is under the influence of heat, and removing the products of distillation quickly and continuously from the distillation point and from contact with the distilling liquid.

10. In a process for the manufacture of neutral alkyl sulfate, subjecting liquid containing free alkyl hydrogen sulfate, free sulfuric acid and free alkyl alcohol in excess over the sulfuric acid, to distillation under reduced pressure in a manner whereby at any given moment only that small part of the liquid which is actually undergoing distillation is under the influence of heat, and removing the products of distillation quickly and continuously from the distillation point and from contact with the distilling liquid.

In testimony whereof I have hereunto subscribed my name.

WALTER BADER.